United States Patent [19]

Petersen

[11] Patent Number: 4,949,000
[45] Date of Patent: Aug. 14, 1990

[54] D.C. MOTOR

[75] Inventor: Christian C. Petersen, Fremont, Calif.

[73] Assignee: Mueller and Smith, LPA, Columbus, Ohio

[21] Appl. No.: 220,235

[22] Filed: Jul. 18, 1988

[51] Int. Cl.$^5$ ............................................. H02K 1/00
[52] U.S. Cl. ..................................... 310/179; 310/46; 310/90; 310/68 R; 310/156; 310/216; 310/254; 29/596; 318/254
[58] Field of Search ............... 310/67 R, 42, 181, 180, 310/46, 185, 177, 156, 268, 90, 218, 68 R, 216, 194, 179, 254, 261; 29/596, 598; 318/138, 254

[56] References Cited

U.S. PATENT DOCUMENTS

| | | | |
|---|---|---|---|
| 3,124,733 | 3/1964 | Andrews | 318/138 |
| 3,483,613 | 12/1969 | Malcolm | 310/216 |
| 3,599,050 | 8/1971 | Komatsu | 318/138 |
| 4,072,881 | 2/1978 | Ban | 318/138 |
| 4,174,484 | 11/1979 | Schmider | 310/68 |
| 4,330,727 | 5/1982 | Oudet | 310/268 |
| 4,508,998 | 4/1985 | Hahn | 318/138 |
| 4,571,528 | 2/1986 | McGee et al. | 318/138 |
| 4,626,727 | 12/1986 | Janson | 310/156 |
| 4,629,919 | 12/1986 | Merkle | 310/67 R |
| 4,633,149 | 12/1986 | Welterlin | 318/254 |
| 4,647,803 | 3/1987 | von der Heide | 310/90 |
| 4,658,312 | 4/1987 | Elsasser | 310/156 |
| 4,668,884 | 5/1987 | Amao et al. | 310/68 |
| 4,731,554 | 3/1988 | Hall et al. | 310/67 |
| 4,745,345 | 5/1988 | Petersen | 318/254 |
| 4,763,050 | 8/1988 | Ruppert | 318/254 |

Primary Examiner—R. Skudy
Attorney, Agent, or Firm—Mueller and Smith

[57] ABSTRACT

A P.M. d.c. motor in which the permanent magnets thereof are provided as thin arcuate segments of predetermined length which rotate about a circular locus of core component defining poles. The paired permanent magnets are configured to slightly straddle the end surfaces of the core components as they pass thereover to effect a shear form of magnetic interaction with flux interaction regions or surfaces of the laminar core components. This serves to substantially minimize axially directed magnetic attractive forces including any time varying axial force terms which may be developed in consequence of commutation. Further a localize rotor balancing is achieved. A highly efficient core structure formed as a core base having outwardly extending legs which are bent perpendicularly upward to form upstanding core components is provided. Additionally, an aerodynamic seal is developed at the periphery of the rotor stator combination to provide for the isolation of any contaminants.

16 Claims, 10 Drawing Sheets

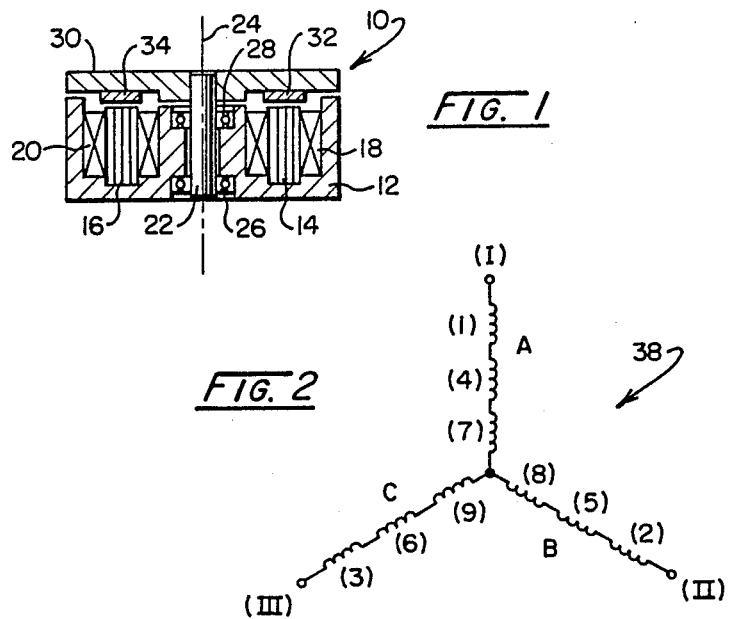
FIG. 1
FIG. 2
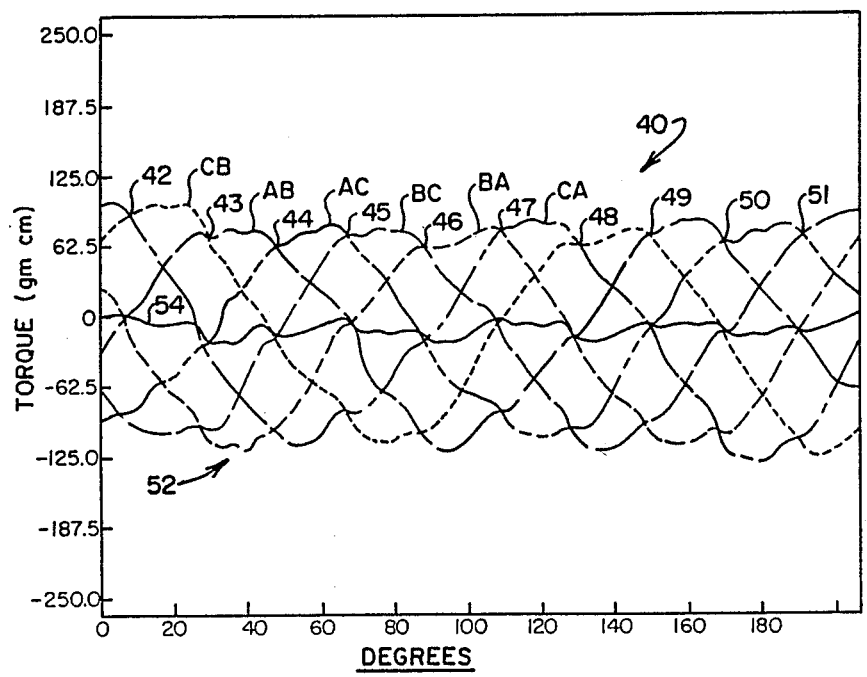
FIG. 3

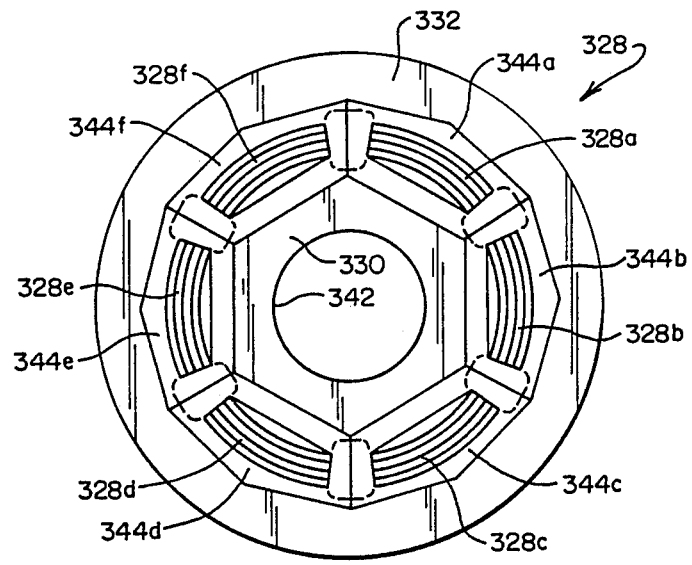
FIG. 15
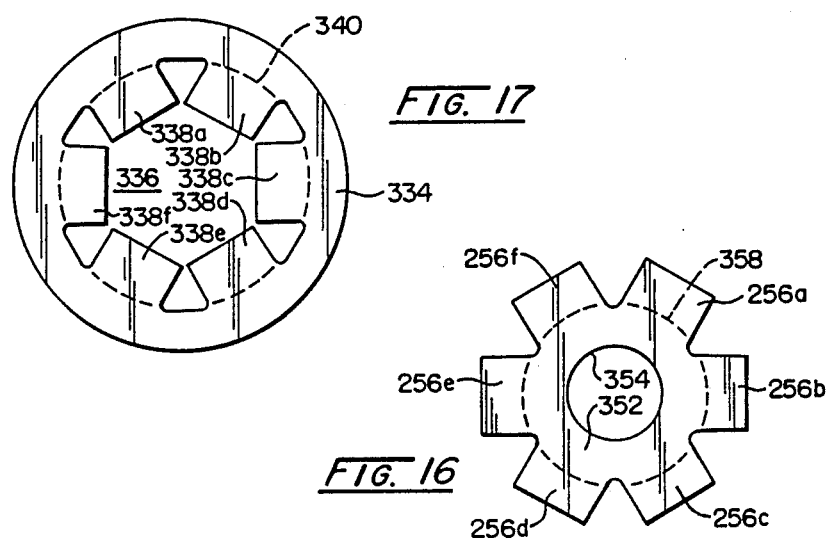
FIG. 17
FIG. 16

D.C. MOTOR

BACKGROUND OF THE INVENTION

Investigators involved in modern electronic and electromechanical industries increasingly have sought more refined and efficient devices and techniques in the generation of motion and the effectuation of its control. For example, the mass storage of data for popularly sized computers is carried out by recordation on magnetic disks which are rotatably driven under exacting specifications. The data handling performance of such memory handling systems relies to a considerable degree upon the quality and reliability of the rotational drive components associated with them. Similar requirements for enhanced motion-drive performance are observed to be expanding in the fields such as robotics, machine tools, and the like.

Permanent magnet (P.M.) direct current (d.c.) motors generally have been elected by designers as the more appropriate device for refined motion generation or drive. Clasically, the P.M. d.c. motor is a three-phase device having a stator functioning to mount two or more permanent magnet poles which perform in conjunction with three or more rotor mounted field windings. These windings are positioned over the inward portions of rotor pole structures typically formed of laminated steel sheets. The ends or tip portions of the rotor poles conventionally are flared or curved somewhat broadly to improve their magnetic interaction with the stator magnet. Field windings are intercoupled with either a delta or a Y circuit configuration and by exciting them in a particular sequence, an electromagnetic field, in effect, is caused to move from one flared pole tip to the next to achieve an interaction with the permanent magnets and evolve rotational motion. This interaction occurs in almost all designs through an air gap which is disposed "radially" to the motor shaft between the stator and rotor. The gap for a "radial" configuration is generally in parallel relationship with the axis of the rotor while flux transfer occurs across the gap radially. The interaction between the permanent magnet field and field of the excited windings being one wherein force vectors are developed in consequence of an association of the exciting field with the field or flux of the magnet. Clasically, the switching providing select excitation of the field windings is provided by a commutator rotating with the rotor and associated with brushes representing a make and break mechanical switching device functioning to move the field along the pole tips.

With the advent of more sophisticated electronic systems such as the disk memory assembly of computers, the classic P.M. d.c. motor has been found to be deficient in many aspects. For example, the make and break commutation of historic designs is electrically noisy and somewhat unreliable, conditions which are unacceptable for such applications. Such motors are relatively large, and this aspect contributes to undesired design requirements for bulk, the designer losing much of the desired flexibility for innovation in applications requiring motor drive. Further, the manufacturer of such motors must cope with a somewhat complex nature of typical rotor pole structures carrying field windings. For example, the production of the windings upon individual poles involves a procedure wherein wire is maneuvered beneath the flared tips of a fully assembled rotor structure.

To address the performance limitations of electrical noise caused by brush-type motors, brushless P.M. d.c. motors have been developed wherein field commutation otherwise carried out mechanically has been replaced with an electronic circuit. These motors generally provide a higher quality performance including much quieter electrical performance. Typically, the permanent magnet components of such quieter electrical systems move as opposed to the field windings of the motor and a radial gap architecture is retained from earlier designs. As in these earlier designs, the windings of the brushless motors are provided beneath flared pole tips on the inside of the stator surface and unfortunately retain the noted difficulties of assembly.

Where d.c. motors are configured having steel core poles and associated field windings performing in conjunction with permanent magnets, there occurs a somewhat inherent development of detent torque. At rest, or in a static state, the steel poles of a typical rotor will assume an orientation with respect to associated permanent magnets which develop flux paths of highest density and the least reluctance. Thus, were one to hand rotate the rotor of an unenergized motor of such design, these positions of rest or detent positions can be felt or tactilly detected as well as the magnetic field induced retardation and acceleration developed in the vicinity of the detent positions. During an ensuing excitation state of the motor windings creating rotational drive, this detent torque will be additively and subtractively superimposed upon the operational characteristic of the motor output to distort the energized torque curve, increase ripple torque, reduce the minimum torque available for starting and, possibly develop instantaneous speed variations (ISV) which are generally uncorrectable, for example, by electronics. ISV characteristics also can be generated from mechanical unbalance phenomena in the rotor of the motor itself or the bearings thereof if they are a part of the rotated mass. Generally, detent torque contributions to ISV and other phenomena are observable in the operational characteristic or torque curve of motors, for example being manifested as a form of ripple torque. In the past, the dynamic output of the motors has been smoothed through resort to rotational masses such as flywheels and the like. However, for great numbers of modern applications, design restraints preclude such correction and motors exhibiting large ISV characteristics are found to be unacceptable. As a consequence, spindle motors for disk drives of computer systems, for example, have been configured as vector cross products or $\bar{B}$ cross $\bar{I}$ devices, sometimes known as voice coil motors, which do not employ steel pole structures.

Petersen, in U.S. Pat. No. 4,745,345 entitled "D.C. Motor with Axially Disposed Working Flux Gap" issued May 17, 1988, describes a P.M. d.c. motor of a brushless variety employing a rotor-stator pole architecture wherein the working flux gap is disposed "axially" (perpendicularly to the motor axis) and wherein the transfer of flux is parallel with the axis of rotation of the motor. This "axial" architecture further employs the use of field windings which are simply structured being supported from stator pole core members which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations. Very often, the space within assemblages made available for retaining the motor function are quite restricted and irregular in general shape. Thus motor design flexibility for such applications represents a subject of increasing interest in industry.

Detent torque characteristics which otherwise might occur with such motor designs are accommodated for by adjusting the geometric design of the permanent magnets within the rotor structure as well as, for example, by developing a skew orientation of the stator core poles. The latter skewing approach, however, necessarily is avoided where the noted design requirements for miniaturization are encountered. Because of the static permanent magnet induced axial forces necessarily present with most such motor structures, accommodation also may be necessary for such forces. These static axial forces may be of such significance as to require the use of "low friction" types of bearings, for example, ball bearings to minimize the d.c. axial force friction effects and permit sufficient starting torques. This requirement also generally imposes the penalty of a larger and more costly bearing structure than might otherwise be required. The designer may also be called upon to address any time varying force term generated in consequence of commutation of the motors. Without such accommodation, for example, noise may be generated which for some applications will be found undesirable.

Another aspect of the design for such P.M. d.c. motors which occurs in conjunction with computer disk drive applications resides in the desirability of effecting a seal of the motor components from the disk-head environment. This requirement follows from the disk environment wherein, for example, a hard disk slider generally floats 20 millionths of an inch or less above the disk surface which spins, for example, at a rate of about 150 mph. The dynamics of such a structure have been likened to a condition wherein an airliner is flown six inches off the ground. A slight obstruction such as a smoke particle can interrupt disk operation. Thus, it is desirable that the drive motors themselves contain some form of a seal which does not detract from their operational efficiency.

SUMMARY

The present invention is addressed to a d.c. P.M. motor having dynamic performance characteristics exhibiting a highly desired smooth rotational torque output and minimal axially directed magnetically induced forces. This desirable performance is achieved while achieving a localized magnetic balance of rotor force components and with a structure which is readily amenable to shape variation and efficient, high volume production techniques. Additionally, the motor structure may incorporate a dynamic seal against environmental contaminants, enhancing its utility for performing spindle drive tasks in the computer field. The invention additionally looks to a method for reducing static axially directed vector attractive forces between a rotor and the stator mounted core components of axial d.c. motors.

Another feature of the invention provides a d.c. motor having a stator structure with a given axis as well as a plurality of mutually magnetically associated core components supported therefrom along a locus of pole positions and extending in generally parallel relationship with the given axis to define a winding association region, a flux interaction region and an end surface. A field winding arrangement is positionable about select ones of the core components in the vicinity of the winding association region and is selectively excitable. A rotor arrangement is rotatable about the given axis and extends over the end surface of each of the core components and a predetermined number of permanent magnet components are located upon the rotor for movement therewith about the locus of pole positions, each being configured for effecting flux coupling relationships substantially only with the core component flux interaction region when the permanent magnet component is substantially adjacent thereto so as to minimize magnetic attraction with the core components along vectors parallel with the given axis. The permanent magnet components are formed of magnetic material exhibiting high coercivity and are magnetized to provide flux transfer substantially only from that surface thereof extending in perpendicular relationship with the given axis.

Another feature of the invention provides a d.c. motor having a stator structure with a centrally located rotor bearing support region disposed about an axis of rotation and a receiving portion disposed outwardly therefrom. A magnetically permeable core structure is provided which comprises a generally ring-shaped core base having a centrally disposed opening and a plurality of core defining legs formed integrally therewith extending from the outer periphery of the core base, each extending perpendicularly upwardly from the base in the vicinity of the periphery to form core components arranged in a predetermined generally circular locus. A field winding arrangement is positioned about the core components and is selectively excitable to effect actuation of the motor. Finally, a rotor arrangement is rotatable about the rotor bearing support region and supports a predetermined number of permanent magnet components for interaction with the core components and the selectively excited windings.

Still another particular feature of the invention looks to a method associated with a d.c. motor of a variety wherein a plurality of core components having excitation windings associated therewith are supported upon a stator structure along a circular locus of pole positions about a motor axis and in which a rotor having permanent magnet components with axially directed magnetization is mounted for rotation above the locus to effect formation of rotational drive torque vectors. The method serves to reduce axially directed vector attractive forces between the rotor and the core components and comprises the steps of:

configuring the core components to provide a flux interaction surface substantially parallel with the axis and extending to an end surface; and locating the permanent magnet components for movement with the rotor along a locus wherein passage is effected adjacent each of the flux interaction surface and magnetic flux interaction is substantially only into the flux interaction surface.

Still another feature of the invention is the provision of a d.c. motor including a stator base having a centrally located rotor bearing support region disposed about an axis of rotation and extending to a circular periphery. A plurality of core components having excitation windings associated therewith are supported upon the stator base along a circular locus of pole positions. A rotor arrangement is mounted upon the stator base at the rotor bearing support region for driven rotation about the axis and having a circular rotor periphery. Permanent magnet components of predetermined number are rotatable with the rotor for drive interaction with the pole positions. An annular sealing cavity is located at the stator base periphery and disposed outwardly from the locus of pole position and a sealing ring is mounted upon and rotatable with the rotor periphery and extensible in non-contacting relationship into the sealing cavity for establishing an aerodynamically derived contaminant block within the cavity when the rotor is rotatably driven.

Another feature of the invention is to provide a d.c. motor including a stator having a centrally-disposed rotor axis. A plurality of magnetically permeable core components are supported upon the stator along a locus of pole positions and each extends in generally parallel relationship with the rotor axis to define a flux interaction region and an end surface. Field windings are positionable about the core components and are excitable for generating an induced field. A rotor assembly is rotatable about the noted axis and extends over the end surfaces of each core component. A predetermined number of paired permanent magnet components are located on the rotor for movement along the locus of pole positions. Each of the component pairs comprise mutually spaced elongate segments spaced in substantially parallel relationship straddling each of the core component end surfaces when moved along the locus and are configured for locally balanced radially-directed magnetic interaction with each of the core components when located in flux transfer association therewith.

Another feature of the invention is to provide a d.c. motor including a stator base having a centrally located rotor bearing support region disposed about an axis of rotation and a core component region disposed outwardly therefrom. A core structure is provided which comprises a generally ring-shape first core base formed of a first predetermined number of superposed magnetically permeable metal sheets, having a centrally disposed opening and a predetermined number of core shaped first legs formed integrally therewith extending from the outer periphery of the first core base, each being shaped perpendicularly upwardly from the first base in the vicinity of the outer periphery to form first core component portions. The structure further includes a generally ring-shaped second laminar core base formed of a second predetermined number of superposed, magnetically permeable metal sheets having a centrally-disposed opening and a number of core shaped second legs corresponding with the predetermined number and shape of the core shaped first legs and extending inwardly from the inner periphery of the second core base, each being bent substantially perpendicularly inwardly from the second base in the vicinity of the inner periphery to form second core component portions, the first core portions and the second core portions being joined in mutual adjacency to form core components arranged in a predetermined generally circular locus within the core component region. A field winding arrangement is positioned about the core components and is selectively excitable to effect actuation of the motor and a rotor assembly is rotatable about the axis of rotation and supports a predetermined number of permanent magnet regions for interaction with the core components and selectively excited windings.

Another feature of the invention resides in the provision of a d.c. motor including a stator assembly having a given axis. A rotor arrangement is rotatable about the given axis and extends outwardly therefrom for supporting arcuately-shaped permanent magnet regions of select widthwise extent between the sides thereof for movement therewith along a circular locus. The magnet regions are magnetized having predefined regions of alternating polarity asserted substantially coaxially with the given axis. A core structure is mounted upon the stator assembly and has a plurality of radially aligned, substantially concentric and mutually paired magnetically permeable core components, each core component extending in generally parallel relationship with the given axis to define a winding association region, a flux interaction region at the mutually, inwardly disposed surfaces of each pair of the core components, and an end surface. The end surfaces of each pair of core components are located adjacent and at opposite sides of the permanent magnet regions at a position selected for effecting flux coupling relationships substantially only with the flux interaction regions when the permanent magnet regions are substantially adjacent thereto so as to minimize magnetic attraction therebetween along force vectors parallel with the given axis and also to provide localized balancing of radially-directed magnetization force vectors.

An additional feature of the invention is to provide a d.c. motor which includes a stator base having a centrally located rotor bearing support region disposed about an axis of rotation and a core component region disposed outwardly therefrom. A core structure is provided which is formed as a laminar assembly of a first metal sheet member having a first core base and integrally formed upstanding first core elements of first widthwise extent spaced apart a first predetermined distance and having a length from end-to-end selected for drawing the ends together to form a first core ring of first diameter. A second metal sheet member is provided having a second core base and integrally formed upstanding second core elements of second widthwise extent spaced apart a second predetermined distance and having a length from end-to-end selected for drawing the ends together to form a second core ring in juxtaposition about the first core ring of second diameter. The first and second core elements are in alignment to form an assembly of laminar cores and the first and second bases are coupled with the stator base at the core component region. A field winding is positioned about the laminar cores and is selectively excitable to effect actuation of the motor and a rotor is rotatable about the axis of rotation and supports a predetermined number of permanent magnet regions for interaction with the core component and the selectively excited field windings.

Other objects of the invention will, in part, be obvious and will, in part, appear hereinafter.

The invention, accordingly, comprises the apparatus and method possessing the construction, combination of elements, arrangement of parts and steps which are exemplified in the following disclosure.

For a fuller understanding of the nature and objects of the invention, reference should be had to the following detailed description taken in connection with the accompanying drawings.

BRIEF DESCRIPTION OF THE DRAWINGS

FIG. 1 is a sectional schematic view of a P.M. d.c. motor having axially magnetized permanent magnets;

FIG. 2 is an electrical schematic diagram of a Y-type excitation winding interconnection;

FIG. 3 is a family of torque curves generated by an axial type d.c. P.M. motor;

FIG. 15 is a plan view of a core component assembly employed with the motor of FIG. 14;

FIG. 16 is a plan view of a component of a core assembly employed either with the motor embodiment of FIG. 12 or FIG. 14;

FIG. 17 is a plan view of one component of the core structure represented in the motor embodiment FIG. 14;

DETAILED DESCRIPTION OF THE INVENTION

Figure 5:
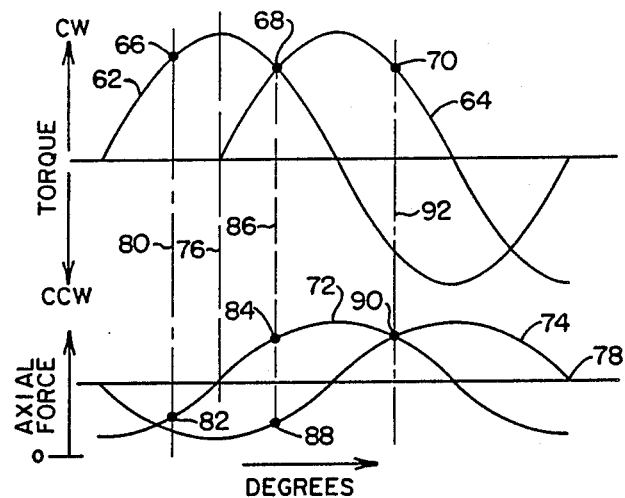
FIG. 5 shows related torque and axial force curves associated with an axial type d.c. P.M. motor.

To promote a more facile understanding of the aspects of the present invention, a simplified, highly schematized representation of an axial d.c. motor is represented generally at 10. Such motors will include a stator base represented at 12 which supports a plurality of core components, as are represented at 14 and 16, in an upright manner. These core components preferably are formed in a laminar manner comprising a series of magnetically permeable metal sheets and typically, are surrounded by field windings represented, respectively, at 18 and 20. The stator base 12 also supports a rotor shaft 22 which is positioned about a central axis 24 and is rotationally retained in position, for example, by bearings as at 26 and 28. The shaft 28 is shown fixed to and supporting a disk-shaped rotor 30, the underside of which supports a plurality of permanent magnet poles, two of which are shown in schematic fashion at 32 and 34. Typically, these magnets 32 and 34 exhibit a high coercivity, inasmuch as they typically encounter flux generated by the field winding and core combinations which is caused to impinge directly at them. Exemplary materials for employment with permanent magnets 32 and 34 are samarium-cobalt, neodinium-iron-boron and others in the rare earth family. In one embodiment of the invention described herein, nine poles or core-field winding combinations are supported within a stator and six permanent magnet regions are located within a rotor structure. The motor of the invention is one designed to provide a high level of dynamic performance while being fabricable not only under high volume production methods but also within a wide range of formats including highly miniaturized versions. To minimize the effects, for example, of detent torque characteristics, the permanent magnet regions as represented at 32 and 34 are of varying extent and separation, while the core components as represented at 14 and 16 are arranged such that their broad dimensions are normal to radii from axis 24, as opposed to being skewed or the like, an arrangement which may be employed to effect control over detent torque and the like. Design criteria for the positioning of permanent magnets to avoid detent torque as well as approaches for field winding excitation procedures achieving optimized torque vectors are described in the above-noted U.S. Pat. No. 4,745,345 by Petersen which is incorporated herein by reference.

Field windings as at 18 and 20 reside in an excitation circuit designed in conjunction with a three-phase approach. The circuit structure may be a typical "Y" or a delta topology. Assuming that a nine pole motor architecture is at hand, a "Y" winding may be represented as shown in FIG. 2 at 38. Each leg of the Y circuit 38 represents a given phase, i.e. phase A, phase B, and phase C. The field winding or coil designations are represented as being numbered 1 through 9 in parenthesis in the drawing and it may be observed that in phase A, windings 1, 4, and 7 are energized, while in phase B, windings 2, 5, and 8 are energized and in phase C, windings 3, 6 and 9 are energized. For the instant example, depending upon electrical convention, a positive electrical coupling may be made to one outer terminal of the Y circuit 38, while negative circuit connection is made to one other terminal. In the sequence of energization, any one given phase is energized in a two-step sequence. Thus, the phase combination, A.C., may be energized by applying a positive source to terminal I while the corresponding negative connection is applied to terminal III. Depending upon any desired direction for rotation of the rotor of the motor, an energizing sequence may be developed as represented in the following tabulation:

ENERGIZING SEQUENCE $AC = (I+)(III-)$ $AB = (I+)(II-)$ $CB = (III+)(II-)$ $CA = (III+)(I-)$ $BA = (II+)(I-)$ $$BC = (II+)(III-)$$

The above-tabulated six-step sequence for energization is repeated in the course of normal motor operation with the objective of creating torque vectors for driving the rotor structure as at 30 which essentially are tangent forces to the circular locus of pole positions represented by the core components and field windings. However, it may be observed that in the schematic representation of FIG. 1, the permanent magnets are located over the tips of stator pole components and as such, there is a constant static load or force of attraction between the rotor 30 and the stator 12. This "steady state" force is further "modulated" or affected additively or subtractively when a permanent magnet region such as at 32 passes directly over a given energized metal core component as at 14. The magnetic force developed therebetween which becomes parallel with the axis 24 when the rotor pole is directly over an energized stator pole represents a magnetic force which is added to or subtracted from the static "force of attraction" between rotor structure 30 and base 12. In effect, the otherwise tangentially oriented energized torque or drive vector developed with the motor system tends to rotate such that it turns downwardly or upwardly when over a given energized core component producing variable forces which are in parallel with axis 24.

Looking to FIG. 3, a compilation of torque output characteristic curves for a typical axial motor having nine stator poles and six permanent magnet rotor poles is represented generally at 40. The type motor output represented by curves 40 is one wherein the permanent magnet regions directly confront the end surfaces of the cores, for example, as described generally at 14 and 16 in FIG. 1. For refined applications of such motors, for example in conjunction with computer system magnetic disk spindle drives, an output is desired at 3600 rpm under a software directed control which carries out a commutation of phases each 20° of rotation. The phases as discussed in conjunction with FIG. 2 are reproduced in conjunction with an appropriate torque output utilizing the same alphabetic characterization as tabulated above. For one direction of performance, for example, commutation occurs across the "top" or "bottom" of the curve displayed. In this regard, a commutation might typically take place in the vicinity of positions 42-51 for a given direction of rotation. For an opposite direction of rotation, essentially the same commutation locations would be presented at the lower portion of the curves as represented generally at 52. A nominal zero point is represented at the middle of these curves through which a detent torque representation is presented by curve 54. The latter curve represents a result of pole centered attraction or repulsion characteristics which generally are minimized by adjusting the geometry or positioning of the permanent magnets within the rotor component.

Figure 4:
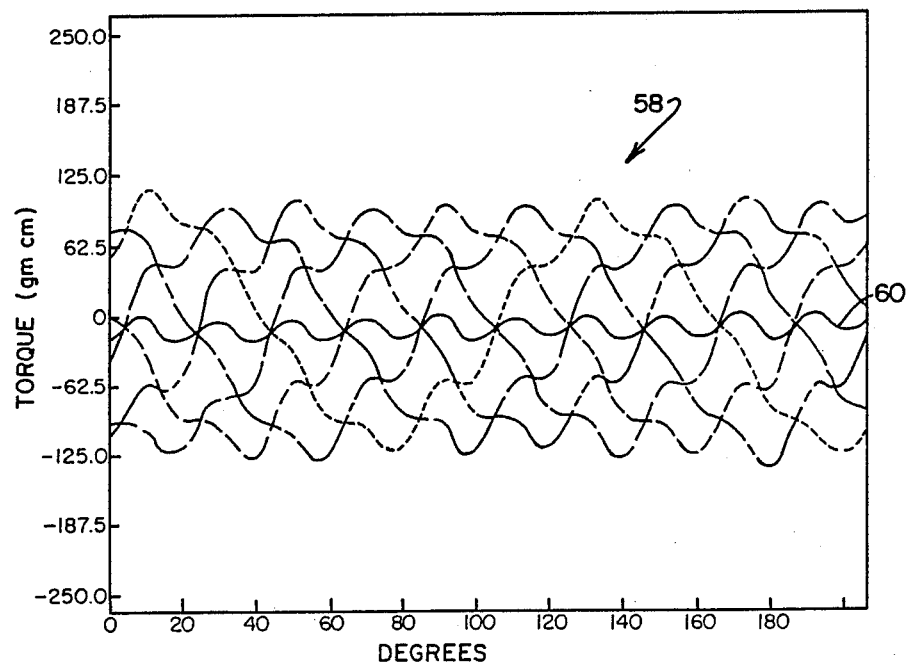
FIG. 4 is a family of torque curves generated by a typical radial type d.c. P.M. motor.

The dynamic drive or torque characteristic for such axial form of d.c. motors have been considered excellent, highly efficient tangent torque vectors being generated in the course of performance of the motors. However, as noted above, these vectors are additive to the D.C. or static force of attraction between the rotor and stator creating a modulating effect on that force of attraction. For a given design the smaller the air gap between the tips of the stator poles and the rotor magnets the greater is the static force of attraction and the greater the modulating force due to the select energization of the stator coils. Where motors of this type are employed, ball bearings and the like are utilized to accommodate for such forces, however, the same forces when modulated by the a.c. excitation derived magnetic terms may also generate noise which in some applications, as in disk drives and the like is at levels which may be deemed unacceptable. However, a comparison with motors of similar size and operational requirements shows that the output represented by torque curve grouping 40 is quite good. In this regard, looking additionally to FIG. 4, a corresponding sequence of torque curves for three-phase operation with a radial form of motor of equivalent size and output is represented in general at 58. Note that the torque curve characteristics are rougher with more undulation representing torque variation. Additionally, the detent curve torque phenomena occuring as represented at curve 60 are shown to have a broader variation.

While the axial motor structure is seen to exhibit the noted excellent dynamic performance characteristics, its architecture is one which necessarily will encounter a time varying force term having a frequency of value developed from its rotational speed and commutation angle selection. This axially directed or developed force can be plotted in conjunction with a corresponding torque vector characteristic. Looking to FIG. 5, torque curves for two adjacent phases are represented at 62 and 64, a regular sinusoid being represented in the interest of clarity. Commutation is selected at points 66 and 68 with respect to curve 62 and, corresponding, at points 68 and 70 with respect to curve 64 where a clockwise (CW) torque direction is contemplated as labelled. The axial forces developed during this same interval in consequence of the attraction of the rotor mounted permanent magnets with the pole pieces are shown as curve 72 with respect to torque curve 62 and as 74 with respect to torque curve 64. It may be observed in comparing these curve pairs that when the torque curves are at a maximum valuation, the corresponding axial force curves are at a minimum or at no additive value to the static force of attraction and vice versa. In this regard, it may be observed from vertical comparison at line 76 that the peak of curve 62 occurs as curve 72 passes through a nominal central value represented by line 78 which corresponds with an average encountered static force magnetically derived between the permanent magnets of the rotor and core component metal. The activity of the axial force represented at curves 72 and 74 may be observed by comparing the status of axial force as commutation occurs in conjunction with curves 62 and 64. Vertical comparison line 80 shows that as commutation at point 66 occurs in conjunction with torque curve 62, a corresponding axial force build-up commences at point 82 of curve 72. This axial force then increases from point 82 to point 84 which, as represented by vertical comparison line 86, represents the point of commutation 68 of torque curves 62 and 70. Drive then is imparted from the active peak region of curve 64 and a sudden dropping of axial force is encountered as that force terminates and a next phase axial force build-up occurs commencing at point 88 of curve 74. This process then repeats itself as axial force develops along curve 74 from point 88 to point 90 which, as represented by vertical comparison line 92 corresponds with commutation position 70 of curve 64. It may be observed that a repeating sawtooth shaped a.c. component of axial force thus is developed which modulates the general axial force occasioned by the magnetic attraction of the permanent magnet regions of the rotor with the stator metal material. Because of the sawtooth shape, the frequency components of the resulting waveform of axial forces contain multiples of the basic switching frequency. These harmonics make it more likely to excite the resonant points of the motor or motor in the installed system causing undesirable audible noise and in the case of application in magnetic hard disk drives, vertical movement of the rotor and the hard disk which could possibly result in failure of the system. The motor structure of the instant invention substantially eliminates both the static force of attraction between the rotor and the stator and the a.c. axial force term to greatly minimize the noted sawtooth characteristic. Where such motors are operated at 3600 rpm and a basic switching frequency of 1080 Hz, this a.c. component signal will occur at the corresponding latter frequency.

Figure 6:
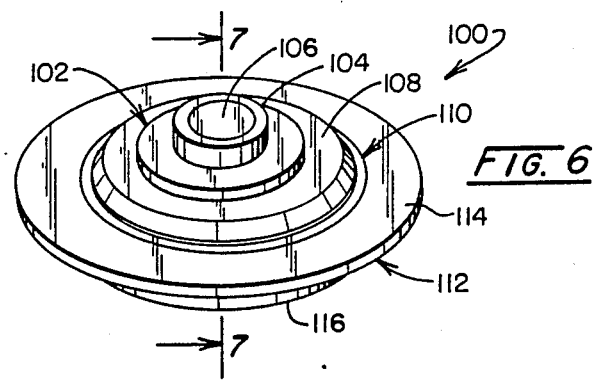
FIG. 6 is a pictorial representation of a d.c. P.M. motor according to the invention.

Referring to FIG. 6, a d.c. P.M. motor is represented in pictorial fashion in general at 100. Motor 100 is structured for application as a disk drive spindle motor. In this regard, it is configured having the same general dimensions and shape as a conventional radial type P.M. d.c. motor, advantage not being taken, for example, of the miniaturization features of the instant invention. The motor is seen to incorporate a rotor represented generally at 102 which is configured having a bearing retaining region shown as at an extension 104 having a cap 106. Extending outwardly from the bearing retaining region 104 is a disk coupling hub region 108 which, in turn, leads to an aerodynamic seal represented in general at 110. The stator for motor 100 is represented in general at 112 and includes a mounting flange 114 and base 116 which serves as a core support structure.

Figure 7:
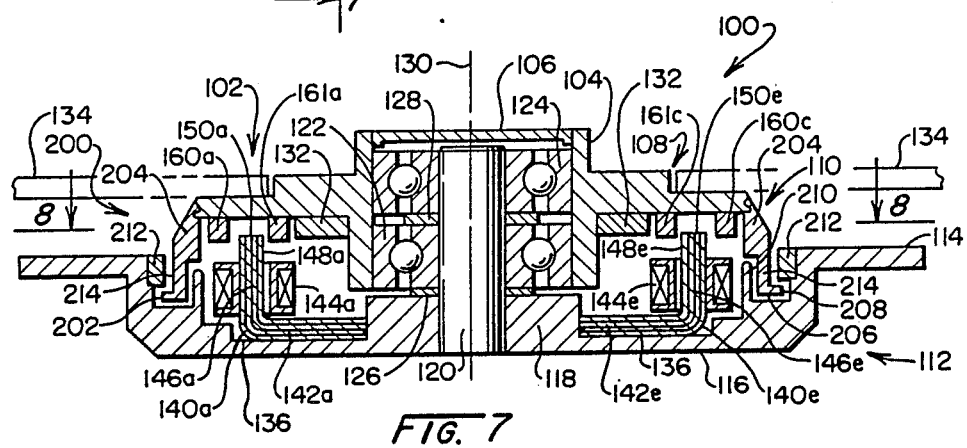
FIG. 7 is a sectional view of the motor of FIG. 6 taken through the plane 7—7 thereof.

Turning to FIG. 7, a sectional representation of motor 100 reveals a central bearing region 118 within the base 116 of stator 112. Region 118 is seen to fixedly support an upstanding shaft 120 over which are journaled bearings 122 and 124. Spacers additionally are provided as at 126 and 128 to appropriately position bearings 122 and 124. Preferably, during the mounting procedure, these bearings 122 and 124 are preloaded into each other to achieve a more stable drive characteristic for rotor 102. Rotation of the latter is seen to be about axis 130 extending through the center of shaft 120. The disk shaped rotor 102 is formed of a magnetically permeable material for purposes of completing the magnetic circuit path of motor 100 ("back iron") and further includes an additional mass of metal 132 surrounding the bearing retaining region 104 which is employed for dynamic balancing purposes, a small amount of the metal being removed at specific locations to carry out balancing. Also depicted in the figure is a representation of a magnetic disk 134 in position against the disk coupling hub region 108, a disk mounting clamp not being shown.

The stator 112 base 116 is seen to be configured having an annular stator base receiving portion 136 which is configured somewhat as a cavity extending from the rotor bearing support region 118. This region 136 functions, in turn, to support core components, two of which are revealed in sectional view at 140a and 140e. Note that the core components are formed of laminar sheets of magnetically permeable material and have a generally L-shaped configuration with a core base, for example, as represented at 142a and 142e supported upon the stator base receiving portion 136. Bobbin-supported field windings as at 144a and 144e surround essentially all of the core components at winding association regions thereof, two of which are shown at 146a and 146e. Located above the winding association regions as at 146a and 146e are flux interaction regions 148a and 148e which extend essentially along the oppositely-disposed surfaces of the core components 140a and 140e to respective surfaces as represented at 150a and 150e.

Figure 8:
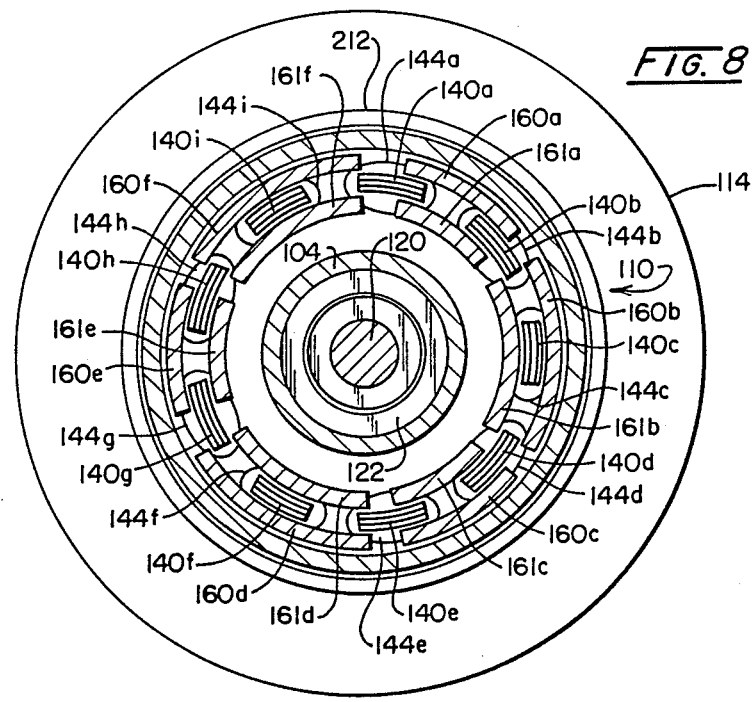
FIG. 8 is a sectional view of the motor of FIG. 7 taken through the plane 8—8 shown therein.
Figure 9:
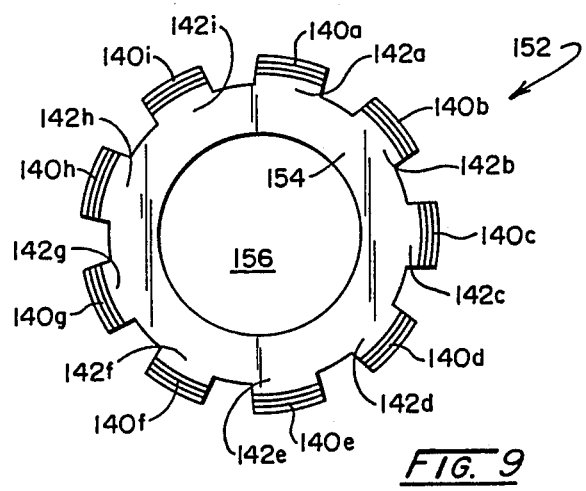
FIG. 9 is an axial plan view of a core assemblage which is employed with the motor of FIG. 7 and 8.

For the instant embodiment, nine stator pole positions with nine core components are provided. Looking additionally to FIG. 8, each of these core components is revealed at 140a–140i as being formed of from a laminar assemblage of stamped sheets of magnetically permeable metal. Referring additionally to FIG. 9, this unitary stamping assemblage is revealed at 152 to include a ring-shaped core base 154 having a centrally-disposed opening 156. The core base 154 is mounted at the stator base receiving portion 136 (FIG. 7), opening 156 fitting over central bearing region 118. Core base 154 extends to integrally formed core defining legs 142a–142i and these legs are bent perpendicularly upward from the base 154 in the vicinity of the periphery thereof to form the noted core components 140a–140i. With the arrangement shown, an ideal laminar-type magnetic circuit base is provided which is manufacturable on a practical basis at high volume and with high dimensional accuracies. It may be observed that insulated bobbin retained field windings represented generally at 144 and individually at 144a–144i are readily positioned over the upstanding core components represented generally at 140 as part of an efficient manufacturing-assembly process.

Returning to FIG. 7, it may be observed that the disk-shaped rotor 102 supports paired elongate, thin magnet segments or components as represented at 160a and 161a as well as at 160c and 161c. These magnet pairs, as additionally are revealed in FIG. 8 are formed to straddle the end surfaces 150a–150i of respective core components 140a–140i as the rotor 102 rotates about axis 130. Six of such paired permanent magnet segments are provided as at 160a, 161a–160f, 161f (FIG. 8). Other magnet structures will include, for example, ring elements having selectively magnetized pole core lengths, the term "components" as used herein is intended to include such structural variations or continous ring-shaped structures with selectively (N-S) magnetized portions or arcuate segments. The arcuate lengths of the segments vary depending upon their radial position within the motor and additionally this architecture is selected to effect a reduction of the detent torque characteristics of the motor. The arrangement is such that as one magnet is drawn rotationally toward a given core, some other magnet is repulsed from that core or drawn towards another core to effect a force cancellation. These permanent magnet segments additionally are formed of a highly anisotropic magnetic material exhibiting a high coercivity and as such their magnetization provides for a flux output from only the pole surfaces or flux generational coupling surface of the axially magnetized magnets. Looking additionally to FIG. 7A, an isolated representation of the rotor magnet-core and winding association is depicted, a general numerical identification of the multiple components heretofore revealed in alphanumerical fashion being provided. Note that the flux generation surfaces 162 and 163 of respective permanent magnet segments or components 160 and 161 extend below the end surface 150 of core component 140 by a small amount. When the rotor 102 is so positioned as it moves about the locus of core components 140a-140i that the magnet segments as at 160 and 161 are adjacent or beside the core component 140, then flux transfer is as represented at 166 and 167 extending downwardly out of surfaces 162 and 163 and into the side flux interaction regions or surfaces 148 of core 140. With this coupling of flux, the resultant magnetic attraction can be categorized as one in shear wherein essentially no axially-directed magnetic attraction vectors are generated. However, as the rotor 102 continues its rotational movement along the locus of core components, the circumferentially-directed or tangential torque vectors, both static and coil generated, generated as a result of coil activation which are desired for force and rotational motion generation again are developed as in a classical axial form of d.c. motor. Dimunition of the earlier-described axial forces, a.c. components, approaches orders of magnitude. Inasmuch as the permanent magnets as at 160 and 161 are paired upon either side of the core component 140, there is a localized equating of attractive forces inwardly and outwardly in the motor to effect a localized rotor balance. In consequence, the rotor spins more freely and is more efficient with low torque ripple, lending its application to numerous emerging technologies, for instance, as an optical disk drive, spindle motor, etc. There also results a minimum variation in torque, i.e. a highly desirable lessening of ISV characteristics.

Figure 7A:
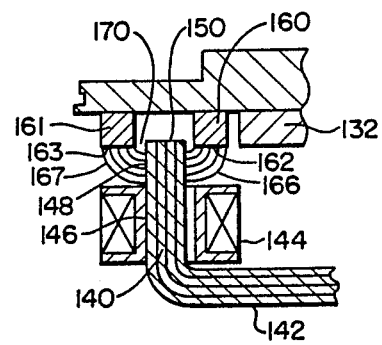
FIG. 7A is a partial enlarged view of the permanent magnet and associated core component of the motor of FIG. 7.
Figure 10A:
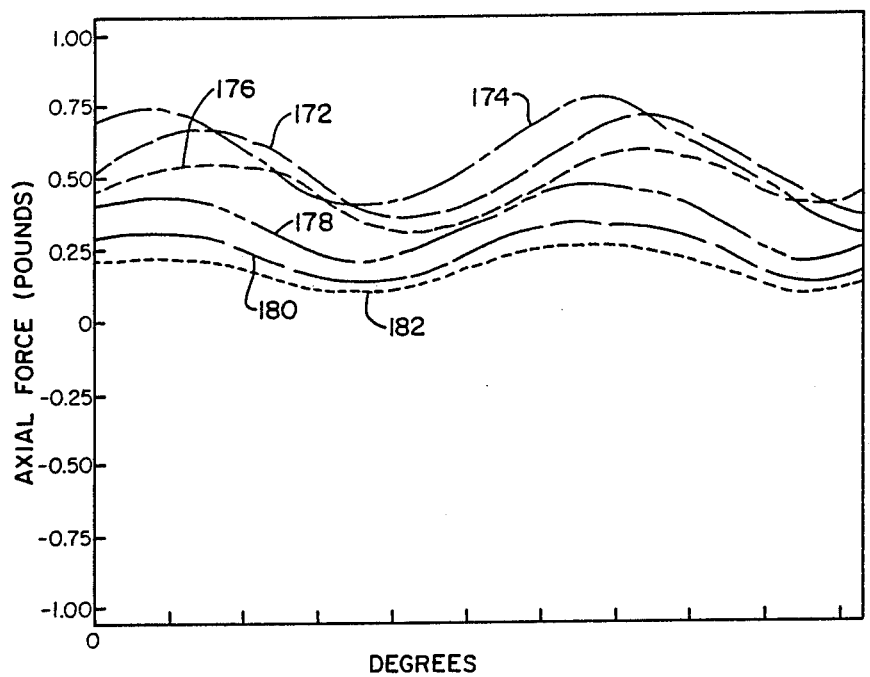
FIGS. 10A and 10B are a family of axial force curves showing the axial force alternations occurring with adjustment of the core-permanent magnet geometry of the motor of FIGS. 7 and 8 and corresponding curves for more conventionally designed axial type motors.

The extent that the flux generation surfaces 162 and 163 as shown in FIG. 7A extend below the end surface 150 of core component 140 has been observed to affect the value of axially-directed static forces and coil generated a.c. forces which are magnetically derived. This "gap" is represented in FIG. 7A at 170 and, for the instant exposition is considered negative when surfaces 162 and 163 extend below surface 150 and vice versa. FIG. 10A represents a family of axial force curves for motors sized for disk drives and shows that where the gap value is zero, a static axial force curve represented at 172 is developed. Where the gap is positive, for example having values of positive 0.015 in. and positive 0.005 in., then similar axial forces are encountered, in effect an overlapping of curves represented at 174 resulting. However, as a negative gap valuation is encountered, a dramatic alteration of resultant axial force is witnessed. For example, for a gap of −0.005 in., curve 176 develops; for a gap of −0.010 in., curve 178 develops; for a gap of −0.015 in., curve 180 obtains; and for a gap of −0.020 in., curve 182 obtains. Considering the later curve, it may be recalled that the a.c. or time varying axial force term having a sawtooth configuration would occur only with respect to the deviation of such a curve 182 from nominal. When static or nominal axial forces range up to 0.5 pound with the addition of ±0.2 pound A.C. component was encountered at positive gaps up to 0.015 inch, the forces with the instant topology developing curve 182 show that the static force is reduced to less than 0.2 pound and the A.C. component to about ±0.05 pound. The physical vertical movement of rotor components for this geometry has been observed to fall to a maximum of eight microinches employing instrumentation having an accuracy to three microinches. As noted above, there results an impressively smooth motor performance ideally suited for a considerable variety of complex technology applications.

Figure 10B:
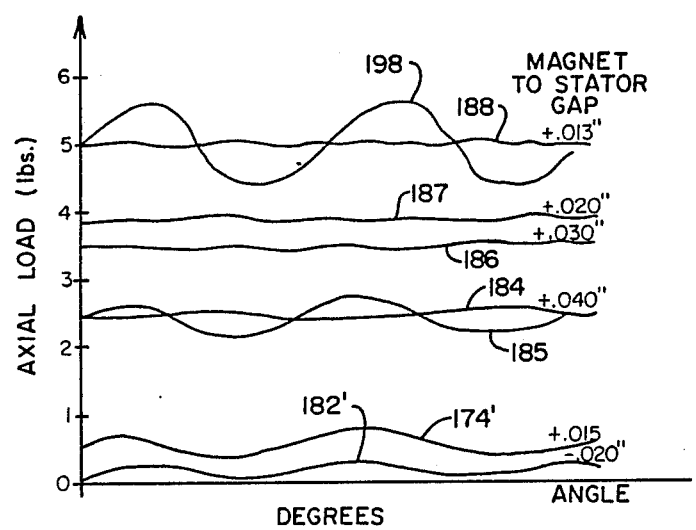

The strikingly advantageous dimunition of magnetically imposed axially directed loads with the configuration of the invention further is illustrated in connection with FIG. 10B. In FIG. 10B, curves 182 and 174 again are reproduced in primed fashion but in conjunction with a vertical axial load scale in pounds which is extended to include corresponding axial loads encountered with axial d.c. p.m. motors as are illustrated in FIG. 1 at 10. The earlier-described gap is that extant between the permanent magnets as at 32 or 34 and the top of the core components extending from the stator as at 14 and 16. Where that gap is relatively large, for example 0.040 inch, then a lesser static axial force is developed having a magnitude, for example, of about 2½ pounds as represented by curve 184. Imposing the a.c. term as described above upon that steady-state force provides a characteristic represented by curve 185. However, this larger extent of the gap will lead to motor inefficiencies due to a lack of adequate magnetic flux coupling. Where the gap is lowered in extent to, for example, 0.03 inch, the resultant static axial force increases to about 3½ pounds as represented by curve 186 and, where the gap is diminished to 0.02 inch, a still larger corresponding axial magnetic steady-state force develops as represented by curve 187. A typically selected gap of 0.013 inch is represented at curve 188 which shows a static axially-directed magnetic force of about 5 pounds. Where the a.c. term is imposed upon this static force, then the resultant modulated axial force characteristic takes the form of curve 189 where it may be seen that modulations amounting to about ±0.5 pound are experienced.

Figure 11:
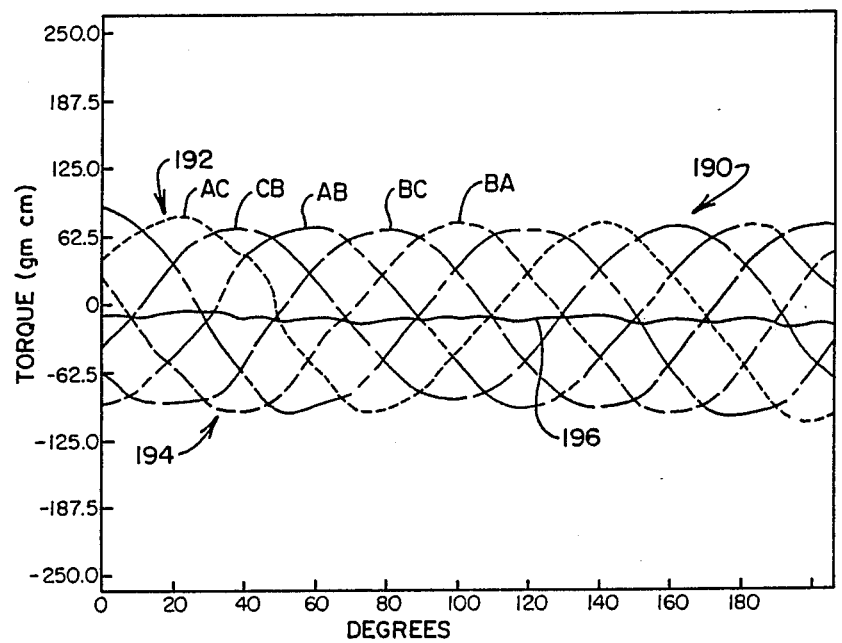
FIG. 11 shows a family of torque curves derived from operation of a motor constructed in accordance with the teachings of the invention.

Looking to FIG. 11, the performance of the motor of the invention with the noted −0.020 in. gap is revealed in general by the torque curves 190. As in the case of FIG. 3, phase identification is provided in the drawing. Comparing the instant figure with the curve grouping 40 of FIG. 3 reveals an important improvement in the consistent and smooth output of the motor whether observing the upper region of the curves, as shown at 192 or for the opposite operational rotation as represented by the curve groupings at 194. Note further should be made of the nominal value or detent torque curve represented at 196 as compared with the earlier-described curve 54. An importantly improved performance over conventional radial motor designs may be observed by comparing curve grouping 190 of FIG. 11 with earlier-discussed curve grouping 58 of FIG. 4.

Returning to FIG. 7, the structure of motor 100 is seen to lend itself to the development of a dynamic seal at its periphery representing the interface of the spinning edge of rotor 102 and the stator 112. Such a seal finds particular utility where the motor is employed as a spindle drive for magnetic disks within a computer environment. In particular, it is important that the region represented in general at 200 intermediate the rotor-stator interface and the magnetic disk 134 be maintained absolutely clear of contaminants. The dynamic seal represented in general at 110 includes a sealing cavity 202 having a generally U-shaped configuration and positioned at the periphery of motor 100 outwardly of the core 140 field winding 144 defined locus of pole positions. Extending into the cavity 202 is a sealing ring 204 which is coupled to the disk-shaped rotor 102 at its outer periphery and extends to a lower flange 206 which, in turn, extends to an annular peripheral tip 208. As such, a first or internal gap 210 is seen to extend from the internal portions of motor 100 along the surface of cavity 202 and sealing ring 204 to the tip 208. The latter tip 208 represents an annular surface of highest rotational speed. Correspondingly, an outer ring component 212 is mounted upon the stator base 116 adjacent the sealing cavity 202 to define a second or external gap 214 with respect to the surface of the sealing ring 204. This gap 214 also exteds to the annular tip 208 or position of highest surface speed of the rotor 102. As a consequence of this arrangement, any contaminants will tend to accumulate at the location of highest surface speed 208 to assure the cleanliness of important region 200. Sealing ring 204 as well as outer ring component 212 may conveniently be formed of a dimensionally stable plastic. The rings may be configured to readily snap into place and, thus, are amenable to the important aspects of accurate, high volume production procedures.

The instant d.c. motor topology lends itself to a board variety of configurations including a miniaturization heretofore found difficult to achieve with more conventional radial design devices. Reduction in dimension can be a requirement for design in a variety of geometric aspects, for example in the direction parallel to the axis or in a diametric direction with respect to the axis of rotation of the motor. Further, some product form-fit requirments will be established for non-uniform geometric spaces.

Figure 12:
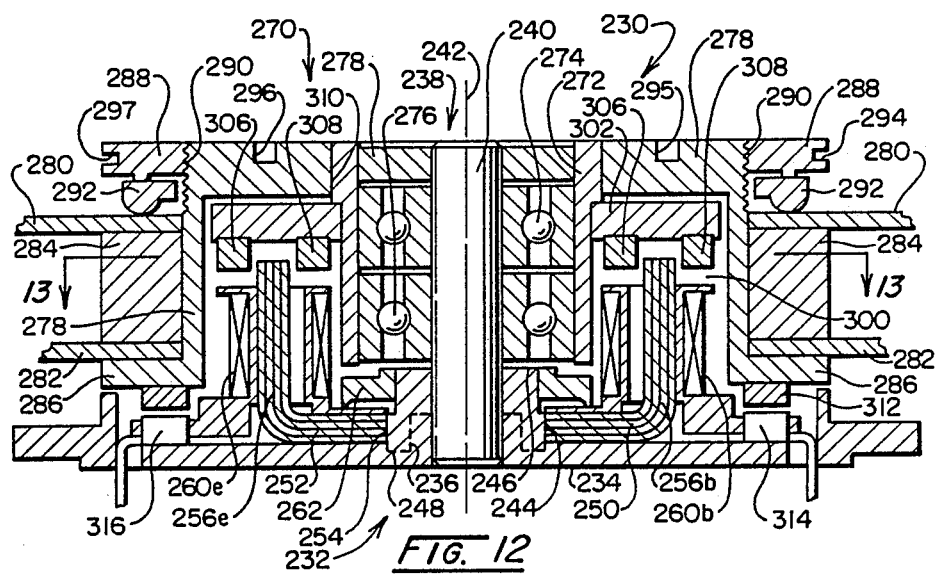
FIG. 12 is a sectional elevational view of a P.M. d.c. motor embodiment of the invention.

Looking to FIG. 12, a highly miniaturized version of the motor structure of the invention suited in particular for computer memory disk drive applications is revealed generally at 230. Motor 230 is one which essentially fits within the hub of a disk drive itself, thus requiring severe restrictions of the noted diametric extent of resultant design geometry. For example the diameter of the cab of motor 230 is 25 mm and the total height is limited to 15 mm. The motor is seen to have a stator structure represented generally at 232 which includes a stator base 234, the principal component of which is a stator support assembly or element 236. Assembly 236 is positioned at a centrally located rotor bearing suport region 238 and is seen to be bored to receive and support a shaft 240 which is coaxially aligned with the axis of rotation 242 of the motor 230. Further, element 236 is configured having a cylindrically shaped core mounting surface 244 and an upwardly disposed bearing surface region 246. For the instant embodiment, the base 234 is seen extending outwardly in generally disk shaped form and is combined with stator support element 236 such that the entire motor 230 may be mounted on the flanged outer portion of base 234. However, the motor mount via a press fit of the shaft 240 into a housing surface, for example, of a disk drive assembly. In this configuration base 234 becomes part of the housing surface to which the motor is to be assembled. For such purposes, for example, the assembly 236 lower disposed portions may take the shape represented in phantom at 248 such that the assembly including shaft 240 becomes mountable in such housing surface.

Figure 13:
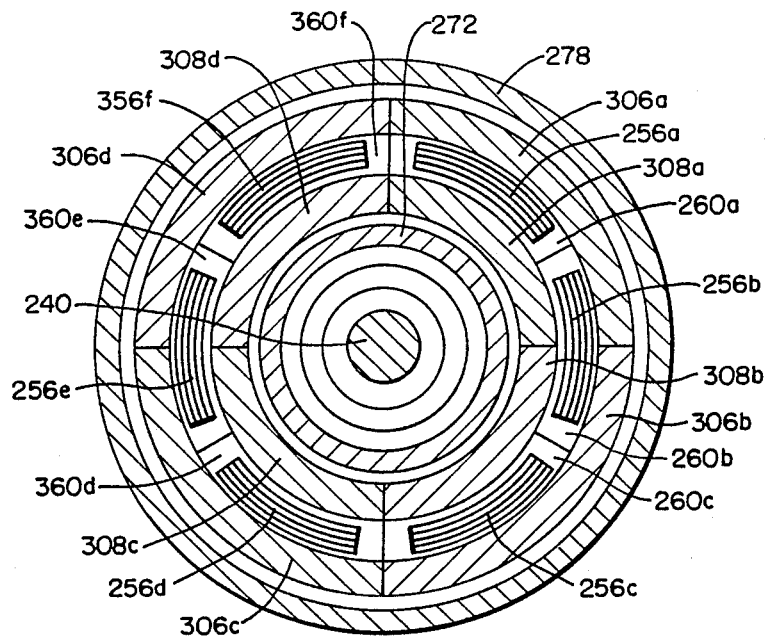
FIG. 13 is a sectional view of the motor of FIG. 12 taken through the plane 13—13 thereof.

As in the earlier motor embodiments, a magnetically permeable structure made up from four lamination blanks is provided with the instant embodiment as represented generally at 250. Core structure 250 is fashioned having a ring-shaped core base 252 further including a centrally disposed opening 254 which is positioned over and press fitted against the core mounting surface 244 of stator support assembly 236. From the base 252 six legs or core components are bent perpendicularly upwardly two of which are seen at 256b and 256e and of which all six are seen in FIG. 13 at 256a-256f. Looking momentarily to FIG. 16, one of the four lamination blanks making up the core structure 250 is revealed showing the circular opening 254, the periphery of the ring-shaped base at 258 and the legs 256a-256f for this laminar sheet prior to their being bent perpendicularly upwardly from the base 252. In assembly, four of the lamination blanks, which are formed of a magnetically permeable material which is covered with an insulative coating, are placed upon a forming tool to achieve the structure shown. Following such forming, the laminar sheets are assembled together to requisite dimensions and tolerances. When completed, the assemblage, with the exception of having six core components for the instant embodiment, has the appearance of the core assembly shown in FIG. 9. Upon completing such assembly, field windings which are positioned upon insulative bobbins are placed over the core components 256a-256f to provide field winding-bobbin assemblies as are shown in FIG. 13 at 260a-260f. Two such assemblies are shown in FIG. 12 at 260b and 260e. Returning to FIG. 12, the assembly of bobbins and field windings 260a-260f is retained in position by the stator support assembly 236. In this regard, the stator support assembly includes a retainer flange 262 which, is of cylindrical shape having a central opening which is pressed down upon the cylindrical upper portion of support assembly 236 and includes a wedge-shaped outer circular periphery which is seen to engage and retain the insulative bobbin component of the field winding-bobbin assemblies 260a-260f. This connection is seen in FIG. 12 in connection with assemblies 260b and 260e. For the earlier-noted alternate embodiment of the stator support assembly 236 involving the structure shown in phantom at 248, the retained flange 262 may be formed integrally with stator support assembly 236. As in the earlier embodiments of the motor, the field winding-bobbin assemblies 260a-260f are located adjacent a winding association region for respective core components 256a-256f. Further, the core components 256a-256f extend, as before, to define a flux interaction region and end surfaces in the same manner as described in conjunction with FIG. 7A.

The rotor assembly of motor 230 is represented generally at 270 and is seen to comprise a cylindrical bearing sleeve 272 which, for the instant embodiment may be formed, for example, of a non-magnetic stainless steel. Sleeve 272 is mounted for rotation about the shaft 240 by virtue of two bearings 274 and 276 positioned between the inner surface of sleeve 272 and shaft 240. This assemblage may be sealed at the upper side of motor 230 by a seal 278. For assured control over contaminants represented by bearing lubricants and the like, a similar seal may be positioned at the bottom of the sleeve 272 as well as the top and may, for example, be provided as a magnetic fluid seal, thus necessitating the utilization of magnetic stainless steel for the shaft 240.

Press-fitted upon the upward portion of sleeve 272 is the hub component, for example, of a disk drive assembly as represented at 278. Preferably, the hub 278 is formed of aluminum having a coefficient of expansion compatible with the materials constituting such implements which are driven by the hub as memory disks herein represented at 280 and 282. Disks 280 and 282 are seen spaced by a ring-shaped spacer 284 performing in conjunction with an outwardly-directed flange portion 286 and an upwardly-disposed spanner nut 288 which is threadably engaged at 290 with hub 278. A semi-crushable ring 292 is provided beneath the spanner nut 288 to protect the disk assembly and spanner wrench connection is shown provided by bores as at 294–297.

Because of the need for accommodating motor structure 230 to the material requirements, for example for such implementations as an in hub disk drive mounting, it is necessary to provide the magnetically permeable permanent magnet support in isolation from the hub structure to avoid expansion or contraction interference phenomena. Accordingly, the hub 278 is configured having an interiorly disposed cavity, air gap, or drive region separating it from the rotor and represented generally at 300. This region is located over the locus of core components 256a–256f and further is seen to include a magnetically permeable support ring 302 which is machined to provide two concentric grooves for aligning two concentric permanent magnet rings 306 and 308. Note that the support ring 302 is spaced from the underside of hub assembly 278 in consequence of a cylindrical step 310 which may be machined either within sleeve 272 or the hub 278. Thus, the iron containing sleeve 302 may expand and contract without affecting the corresponding expansion and contraction of hub 278. Looking to FIG. 13, the magnetic rings 306 and 308 are seen to be axially magnetized with successively alternating polarities in four quadrants represented, respectively, at 306a–306d and 308a–308d.

Assembly of the rotor structure 270 is carried out by rough machining the hub 278, following which it is pressed onto the upper portion of sleeve 272. The interior of sleeve 272 then is finish machined to assure no distortion as occasioned by the fitting of hub 278 thereon. The ring magnets 306 and 308 then are cemented to the corresponding grooves in support ring 302 following which they are magnetized in alternate polar directions and in the axial sense of axis 242 in 90° segments as identified in FIG. 13. The resultant magnetized assemblage of support ring 302 and magnetized rings 306 and 308 then is cemented in position upon sleeve 272 as spaced from the underside thereof by step 310. Bearings then are mounted and the final assembly occurs.

Figure 14:
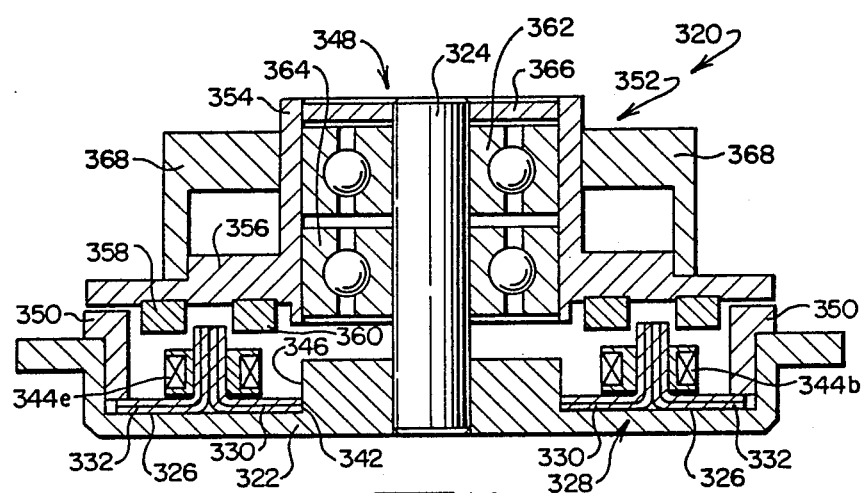
FIG. 14 is a sectional view of another embodiment of a motor configured according to the invention.

Rotational position monitoring may be provided with respect to the rotor assembly 270 by the provision, for example, of a plastic magnet ring 312 located at the underside of flange 286 of hub 278. This ring, for example, may be magnetized in opposite polar senses in correspondence with the polarity of magnetization of the magnetic rings 306 and 308. Detection of the position of ring 312 so magnetized may be provided, for example, by Hall devices as are shown at 314 and 316. The latter devices 314 and 316 may be positionally mounted by molding extensions to the bobbins of appropriate ones of the field winding-bobbin assemblies 260a–260f.

Where the application of the motor of the invention requires a minimization of dimension along the rotational axis, reduction of this dimension may be enhanced by a restructuring of the core components. Looking to FIG. 14, such an alternate motor structuring is represented in general at 320. Motor 320 is seen to have a stator base assembly 322 which supports an upstanding shaft 324. The base 322 is seen to be configured having a ring-shaped cavity 326 formed therein which receives a core structure represented generally at 328. Structure 328 is configured to minimize the thickness of its base and thus minimize the dimensions of motor 320 along its axial direction. To provide for such dimensional control, the core 328 is formed from two configurations of lamination blanks. One such configuration is as described in conjunction with FIG. 16 and serves to provide the two-part core structure portion represented at 330. The opposite portion of core structure 328 has an outwardly-disposed base and is represented at 332. Looking to FIG. 17, this outward component 332 is seen to be formed having a generally ring-shaped laminar core base portion 334 which also has a centrally-disposed opening 336 as well as a number of core-shaped legs corresponding with the legs forming core component 330. These legs as are shown in FIG. 17 at 338a–338f to extend inwardly toward opening 336 from an inward periphery represented by dashed line 340. Thus, the leg components 338a–338f may be bent upwardly in the same manner as the interior disposed core components to achieve the structure shown in FIG. 14. To create a sufficient cross-sectional area of laminar magnetically permeable material for flux circuit purposes, it may be observed that the upstanding core component has a cross-sectional area which is replicated by two thinner oppositely-disposed core base portions located within the ring-shaped cavity 326. Thus, a sufficient amount of magnetically permeable material is available to avoid saturation, while the larger thickness otherwise required is avoided. The resultant assembled core structure 328 is revealed in FIG. 15 as incorporating core-pole components 328a–328f which are positioned about a central opening 342. As before, insulative bobbins carrying field windings are positioned over the core components 328a–328f as represented at 344a–344f. Dual core component assembly 328 is mounted upon the base structure 322 at the cylindrical core mounting surface thereof 346 which is positioned circumferentially around shaft 324 adjacent the bearing support region 348 of the base 322. An insulative ring 350 is shown retaining the outwardly disposed base portion of core component 332 to complete the stator assembly. The rotor assembly for motor 320 includes a magnetically permeable rotor housing 352 having an upstanding bearing support sleeve portion 354 and a permanent magnet supporting disk portion 356. As in the earlier embodiments, the disk portion 356 provides a "back iron" function and serves to support adhesively attached concentric permanent magnet rings 358 and 360. As before, for the six stator pole embodiment shown, four oppositely polarized regions are provided within the ring magnets 358 and 360 utilizing axial magnetization procedures and providing such alternating polarity in quadrature. Two bearing assemblies 362 and 364 provide for the mounting of the rotor housing 352 upon shaft 324. As before, a seal may be provided as at 366 and an implement supporting hub 368 may be positioned over rotor housing 352 as illustrated. Operation of the motor 320 is similar to the earlier-described embodiments in that the quadrant axially magnetized components of magnet rings 358 and 360 interact with the flux interaction regions of the core components 328a–328f when they are approaching adjacency therewith to provide uniform rotational torque with localized balance of rotor force components and avoidance of axially directed force vectors.

Figure 18:
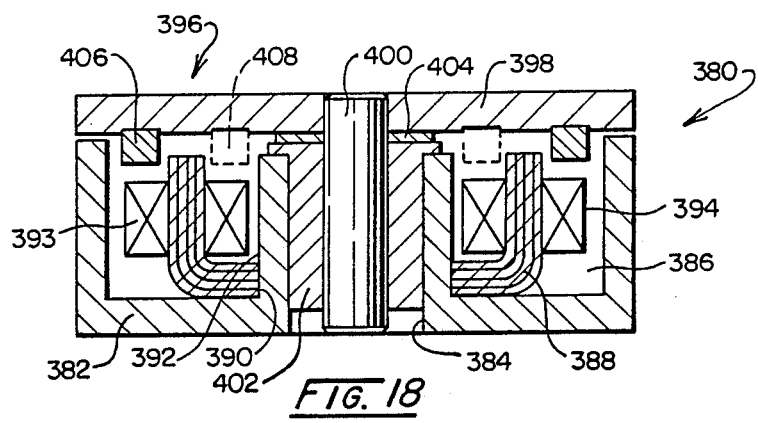
FIG. 18 is a sectional schematic view of another embodiment of a motor according to the invention.

Turning to FIG. 18, another embodiment of a motor according to the invention is revealed in general at 380. The embodiment represented by motor 380 is one wherein more severe constraints are imposed upon the designer for minimizing the diametric extent of the motor. Further, because the motor 380 employs the geometry avoiding high axial force generation between the permanent magnets and core components, it will be seen to be structured enjoying a less expensive sleeve bearing arrangement for the rotor. FIG. 18 shows that the motor 380 incorporates a base structure 382 having a cylindrical bearing receiving opening 384. Outwardly disposed from opening 384 is an annular base cavity 386 within which is positioned a core structure 388 formed in the manner of core structure 250 described, for example, in FIGS. 12 and 13. In this regard, the inner circular opening of structure 388 at 390 is press fitted against a a corresponding cylindrical surface 392 disposed oppositely bearing receiving opening 384. Field winding-bobbin assemblies as represented at 393 and 394 are positioned over the individual core components or legs of the structure 388 in the manner above disclosed. The rotor assembly represented generally at 396 for motor 380 includes an upper magnetically permeable disk 398 which, in turn, is fixed to a shaft 400. Shaft 400, in turn, is mounted for rotation within a sleeve bearing 402 mounted within the bearing receiving opening 384. A spacer washer 404 serves to vertically position the rotor assembly 396. As before, the disk component of the rotor assembly 396 adhesively retains thin rings of magnets arranged concentrically on opposite sides or in straddling relationship with the locus of core components defined by structure 388. These concentric ring-shaped magnets are represented at 406 and 408, the latter being represented in phantom as an alternative arrangement for the motor structure 380. These magnets, as before, for example when employed with a six-pole stator structure, will be magnetized axially in sequentially opposite polar senses in four equally spaced quadrants. Where it is necessary to conserve diametric space, magnet ring 408 can be dispensed with. However, the earlier-described localized balancing of radially directed magnetic force vectors is jeopardized with such as arrangement. Additionally, the amount of magnetic material available in the rotor structure becomes more limited.

Figure 19:
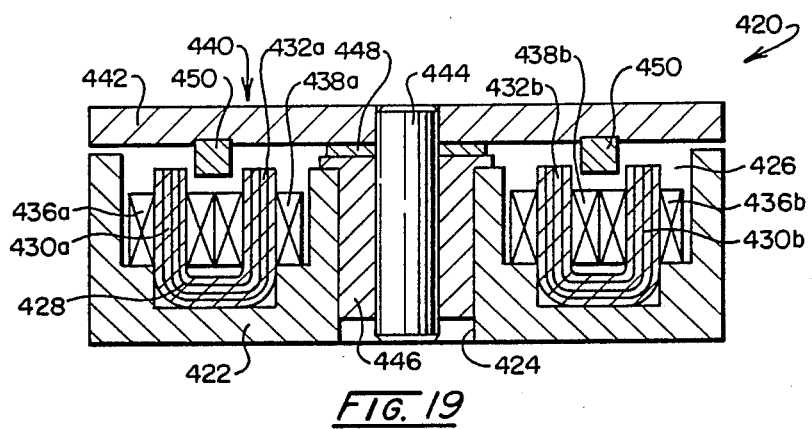
FIG. 19 is a schematic sectional view of another embodiment of the motor according to the invention.

Referring to FIG. 19, a motor structure is represented generally at 420 wherein, while a singular magnetic ring is employed, localized rotor balancing is achieved through employment of a two-pole approach for the stator core structure. Motor 420 is seen to incorporate a stator base assembly 422 having a bearing receiving opening 424 and an annular shape core component receiving cavity 426. The stator core component structure 428 is seen to have a generally U-shaped cross section with two, inner and outer core pole components as at 430a and 430b positioned adjacent inner core components as at 432a and 432b. These core components, as before, are formed of laminated sheets of magnetically permeable material. Additionally, each of the core legs is configrued to receive a bobbin-field winding assembly. In this regard, core leg 430a is shown receiving winding-bobbin assembly 436a, while corresponding core leg or component 430b is shown supporting bobbin assembly 436b. Similarly, the inwardly-disposed core leg 432a is shown supporting a field winding-bobbin assembly 438a, and correspondingly, the inwardly-directed core leg 432b is seen supporting field winding-bobbin assembly 438b. The rotor assembly for motor 420 is represented generally at 440 and includes a rotor disk 442 fashioned of magnetically permeable material which is supported upon and fixed to a rotatable shaft 444. Shaft 444, in turn, is journaled for rotation within a sleeve bearing 446 formed of sintered bronze or the like. A spacer washer 448 serves to vertically position the rotor structure 440. For the instant embodiment, only a singular arcuate permanent magnet structure is mounted upon disk 442 shown at 450. This magnet structure 450 is axially magnetized in the earlier embodiment and is appropriately positioned to minimize the generation of axially-directed magnetic force vectors. However, the singular permanent magnet arrangement achieves a localized rotor balancing through the utilization of the dual core component geometry. Additionally, as before, for example for a stator core structure of six poles, the arcuate magnet structure 450 will be magnetized axially in an alternating polar sense each 90° or in quadrature.

Figure 20:
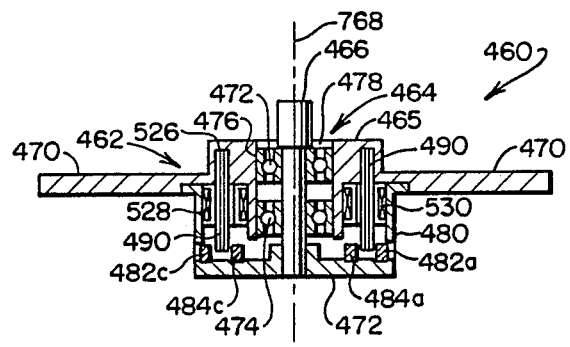
FIG. 20 is a sectional view of another embodiment of a motor configured according to the invention.

Referring to FIG. 20, still another embodiment of a motor according to the invention is revealed in general at 460. Motor 460 is one which, for example, may be employed in applications wherein the outside diameter of a substantial portion of the rotor-stator assemblage is of minimized extent, for example, about 20 mm. To achieve a practical stator supported core or pole structuring, a unique laminar build-up technique is employed. Motor 460 is seen to include a base represented generally at 462 which is formed having a centrally located rotor bearing support region 464 disposed about a shaft 466 which is mounted for rotation about an axis represented at 468. A core component region 465 is disposed outwardly from region 464 in cylindrically shaped fashion. Base 462 further includes a mounting flange 470 extending from the edge of region 465 which may be affixed to the frame or similar support of the device within which the motor is incorporated.

Shaft 466 is configured to be fixed to and thus rotate with a disk-shaped rotor 473 and, thus, is rotationally supported by bearings 472 and 474 which are mounted within a cylindrical central bore 746 formed within the base rotor bearing supporting region 464. A cap 478 functions to seal the bore 476, while a cylindrical sidewall 480 functions to secure the interior region of motor 460.

Figure 21:
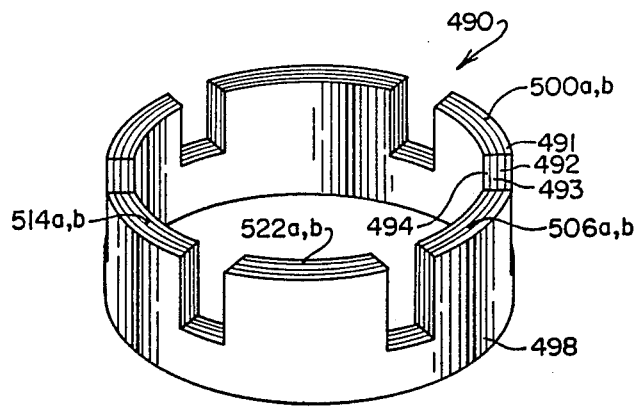
FIG. 21 is a pictorial view of a stator core component employed with the motor of FIG. 20.
Figure 22A:
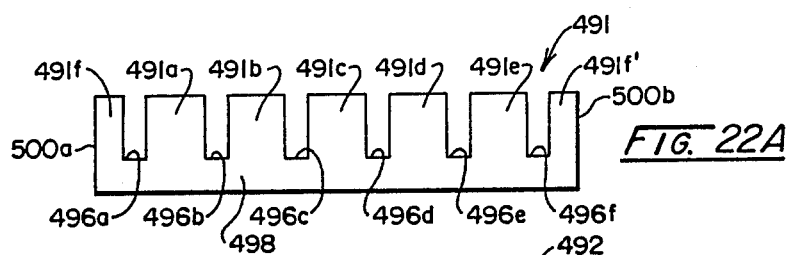
FIGS. 22A-22D are plan views of sheet metal components from which the core component of FIG. 21 is formed.

Rotor 472 is configured to retain arcuate paired permanent magnet segments, two of which are revealed in section at 428a, 484a and 482c, 484c. Four such arcuate paired permanent magnet segments which are magnetized in an axial sense as above-described are provided in the manner set forth at 306a–306d, 308a–308d in FIG. 13 and are appropriately in overlapping form to minimize the generation of axially-directed magnetic force vectors. These four acurate segments are seen to provide upwardly disposed axial flux generation surfaces as before which react with corresponding flux interaction regions within a stator pole core structure represented in general at 490. Looking additionally to FIG. 21, the core structure 490 is revealed in perspective fashion and is seen to be formed of four metal sheet members 491–494. Referring to FIG. 22A, metal sheet member 491 is seen to be formed as a sheet metal stamping of magnetically permeable material which is configured having five integrally formed upstanding core elements 491a–491e of a first predetermined widthwise extent representing the widthwise extent of the core structure outer periphery. Additionally, the sheet 491 includes two upstanding half core elements 491f and 491f'. These latter elements have a widthwise extent amounting to half that of elements 491a–491e. Further, the elements 491a–491f,f' are seen to be spaced apart by slots of predetermined width as represented at 496a–496f. Note additionally that the member 491 is formed having a core base 498 and extends from an end 500a formed in half core component 491f to an end 500b serving as a side of half core component 491f'. When these ends 500a, 500b are drawn together, an outer core ring is developed as represented and identified in FIG. 21.

Figure 22B:
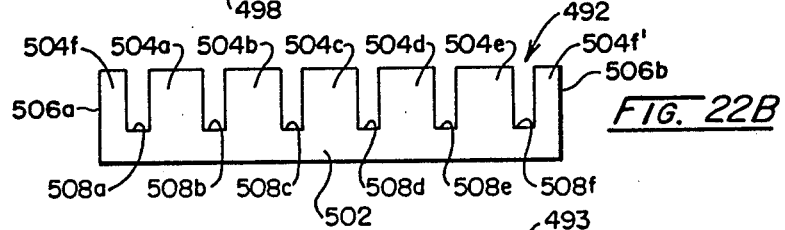

FIG. 22B reveals the pattern for a next internally disposed core ring formed of metal sheet member 492. As before, sheet member 492 includes a core base 502 and five upstanding core elements 504a–504e of next predetermined widthwise extend slightly less than corresponding core elements 491a–491e as represented in FIG. 22A. Similarly, two half core elements 504f and 504f' are formed in member 492 exhibiting edges 506a and 506b. The end-to-end lengthwise extent of member 492 is selected such that when the latter edges 506a, 506b are brought together to form a next interior core ring, that ring, as seen in FIG. 21 will nest within the core ring corresponding to sheet member 491. Preferably, the abutting edges 506a and 506b will be positioned away from adjacent edges 500a, 500b as shown in FIG. 21. The spacings between core elements 504a–504f,f' are represented as a sequence of slots 508a–508f. These slots are configured having a widthwise extent slightly less than those described at 496a–494f in FIG. 22A. This achieves a desired arcuate-like segmenting of each of the resultant core components developed at 490.

Figure 22C:
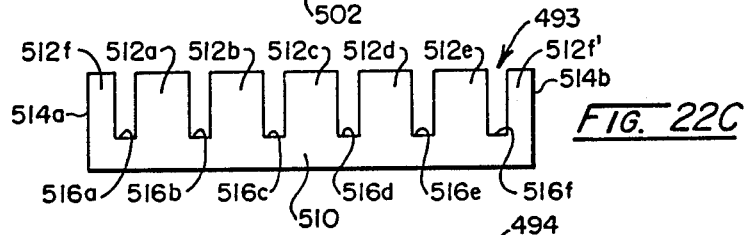

Looking to FIG. 22C, metal sheet member 493 is seen to be configured in similar fashion, having a core base 510 from which are integrally formed five full width upstanding core elements 512a–512e as well as two half-width core elements 512f and 512f'. The latter elements define edges 514a and 514b which are drawn together to form a core ring of a third diametric extent configured to nest within the ring formed of metal sheet 492 as seen in FIG. 21. Additionally, it may be seen in that figure that edges 514a, 514b are in abuttment at a location spaced from the corresponding edge abuttments 500a,b and 506a,b. The core components 512a–512f,f' are shown spaced by slots 516a–516f which are of a widthwise extent lesser than corresponding slots 508a–508f of member 492. Thus, the arcuate segment structuring represented in FIG. 21 is further defined.

Figure 22D:
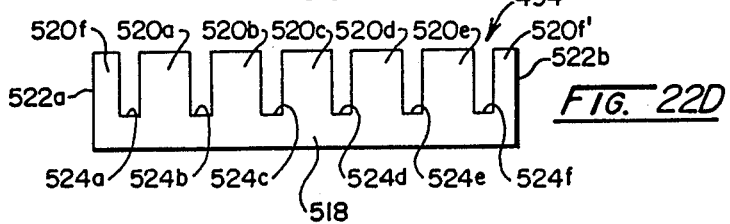

FIG. 22D shows the innermost disposed sheet metal member 494 as comprised of a core base 518 from which are provided upstanding integrally formed core elements 520–520e of widthwise extent slightly less than those shown at 512a–512e as well as core components of half such width as at 520f and 520f'. The latter core elements are shown having upstanding outer edges 522a and 522b which are brought together in abutting adjacency to form an innermost core ring and are located away from abutting edges 514a,b 506a,b, and 500a,b as represented in FIG. 21. The spacing between upstanding core elements 520a–520f,f' is such as to define slots 524a–524f having a widthwise dimension slightly less than the corresponding widthwise dimensions 516a–516f of member 493.

The core structure 490, thus configured, is mounted upon the stator base 462 within the core component region 465. Looking additionally to FIG. 20, it may be observed that the internested core bases 498, 502, 510, and 518 are positioned within an annular slot 526 within the stator 462. Field windings, here provided as wire wound about electrically insulated bobbins, are positioned over each of the resultant core structures, two of which are represented in FIG. 20 at 528 and 530.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. A d.c. motor comprising:
    a stator core support structure having a given axis;
    a plurality of magnetically permeable discrete core components supported upon said support structure along a locus of pole positions and extending in generally parallel relationship with said given axis to define a winding association region, a flux interaction region and an end surface;
    field winding means positionable about select said core components in the vicinity of said winding association region for select excitation;
    a rotor rotatable about said given axis and extending over said end surface of each said core component;
    a predetermined number of permanent magnet components located upon said rotor for movement therewith about said locus of pole positions and each configured having a flux coupling surface extending in perpendicular relationship with said given axis and said flux interaction regions for effecting flux coupling relationships substantially only with said core component flux interaction regions so as to minimize magnetic attraction with said core components along vectors parallel with said axis, said permanent magnet components being formed of magnetic material exhibiting high coercivity and which are magnetized to provide flux transfer substantially only from said flux coupling surface.

2. The d.c. motor of claim 1 in which said permanent magnet components are configured having dimensions along said locus selected to effect a reduction of static state attraction and repulsion induced detent torque characteristics between said permanent magnet components and said core components.

3. The d.c. motor of claim 1 in which each said flux coupling surface of said permanent magnet components is formed having a predetermined width and length and located laterally adjacent to said core component end surfaces.

4. The d.c. motor of claim 1 in which said flux coupling surface of each said permanent magnet components is of predetermined width and length and locatable adjacent said core component flux interaction regions during movement of said rotor and spaced a predetermined distance below said end surface.

5. The d.c. motor of claim 1 in which said permanent magnet components are configured as paired, thin elongate segments, mutually spaced in substantially concentric relationship for straddling said core component end surfaces when moved along said locus.

6. The d.c. motor of claim 1 in which:
    said rotor includes a magnetically permeable rotor housing; and
    said permanent magnet components are configured as paired, thin generally arcuate shaped components, mutually spaced in substantially concentric relationship and mounted upon and extending from said rotor housing.

7. A d.c. motor comprising:
    a stator core support structure having a centrally located rotor bearing support region disposed about an axis of rotation, said stator core support structure including a stator support assembly within said rotor bearing support region having a bearing surface region, a core mounting surface, and a cylindrical shaft mounted to extend from said bearing surface region coaxially with said axis of rotation;

a magnetically permeable core structure supported at said centrally disposed opening upon said stator support assembly core mounting surface comprising a generally ring-shaped core base having a centrally disposed opening and a plurality of core-defining legs formed integrally therewith extending from the outer periphery of said core base, each said core-defining leg extending perpendicularly upwardly from said base in the vicinity of said periphery to form core components arranged in a predetermined generally circular locus;

field winding means positioned about said core components and selectively excitable to effect actuation of said motor; and a rotor rotatable about said axis of rotation and supporting a predetermined number of permanent magnet components for interaction with said core components and selectively excited field winding means, said rotor including:

a bearing sleeve rotatable about said axis above said bearing surface region and having an end surface spaced therefrom;

bearing means mounted upon said shaft intermediate said shaft and said bearing sleeve for supporting and bearing sleeve for rotation about said shaft;

hub means for drivably supporting a driven implement, fixed to said bearing sleeve, and extending therefrom over said core component circular locus to define a drive region; and magnetically permeable support ring means coupled in driving relationship with said bearing sleeve and positioned within said drive region for supporting said permeable magnet components.

8. The d.c. motor of claim 7 in which:
said implement is a memory disk formed of a material having a given coefficient of expansion; and
said hub means is formed of a material exhibiting substantially the same said coefficient of expansion.

9. A d.c. motor comprising:
a stator core support structure having a centrally located rotor bearing support region disposed about an axis of rotation, said stator core support structure including a stator support assembly within said rotor bearing support region having a bearing surface region, a core mounting surface, a cylindrical shaft mounted to extend from said bearing surface region coaxially with said axis of rotation, and a stator support assembly flange portion extending from said core mounting surface;

a magnetically permeable core structure supported at said centrally disposed opening upon said stator support assembly core mounting surface comprising a generally ring-shaped core base having a centrally disposed opening and a plurality of core-defined legs formed integrally therewith extending from the outer periphery of said core base, each said core-defining leg extending perpendicularly upwardly from said base in the vicinity of said periphery to form core components arranged in a predetermined generally circular locus;

field winding means positioned about said core components and selective excitable to effect actuation of said motor and including an insulative bobbin having a bobbin flange portion extending outwardly therefrom adjacent said core base for retention thereupon by said stator support assembly, said bobbin supporting a wire field winding; and a rotor rotatable about said axis of rotation and supporting a predetermined number of permanent magnet components for interaction with said core components and selectively excited field winding means.

10. In a d.c. motor of a variety wherein a plurality of discrete generally parallel core components having excitation windings mounted therewith are supported upon a stator along a circular locus of pole positions about a motor axis and in which a rotor having permanent magnet components with axially directed magnetization is mounted for rotation above said circular locus of pole positions to effect formation of rotational drive torque vectors is provided, the method for reducing axially directed vector attractive forces between said rotor and said core components, comprising the steps of:

configuring said core components to provide a flux interaction surface substantially parallel with said axis and extending to an end surface; and locating said permanent magnet components for movement with said rotor along said circular locus wherein passage is effected below said end surface and adjacent each said flux interaction surface, and magnetic flux interaction, which occurs when a given one of said magnetic components is adjacent a given one of said core components, is substantially only into said flux interaction surface of said given one of said core components.

11. The method of claim 10 including the step of providing said permanent magnet components of elongate, arcuate shape having flux coupling surfaces disposed perpendicularly with respect to said axis and movable into adjacency with said flux interactive regions at locations selectively spaced below said end surfaces.

12. The method of claim 11 in which said permanent magnet components are provided as paired, thin arcuate segments, mutually spaced in substantially concentric relationship.

13. A d.c. motor comprising:
a stator having a centrally disposed rotor axis;
a plurality of magnetically permeable core components supported upon said stator along a locus of pole positions and each extending in generally parallel relationship with said rotor axis to an end surface to define a flux, interaction region;
field winding means positionable about said core components and exictable for generating an induced field;
a rotor rotatable about said axis and extending over said end surfaces of each said core component;
a predetermined number of paired permanent magnet components located upon said rotor for movement along said locus of pole positions, each of said paired permanent magnet components comprising mutually spaced elongate segments spaced in substantially parallel relationship straddling each said core component and extending a select distance below the said end surface thereof when moved along said locus and configured for locally balanced radially directed magnetic interaction with each of said core components when located in flux transfer association therewith.

14. The d.c. motor of claim 13 in which each said pair of permanent magnet components are configured for effecting flux coupling reltionships substantially only with said flux interaction region of said core components when substantially adjacent thereto so as to minimize magnetic attraction with said core components along vectors parallel with said axis.

15. A d.c. motor comprising:
a stator core support structure having a centrally located rotor bearing support region disposed about an axis of rotation and a core component support region disposed outwardly therefrom;
a core structure positioned at said core component support region, comprising a generally ring-shaped first laminar core formed of a first predetermined number of superposed magnetically permeable first metal sheets, each said first metal sheet having a first core base extending from a first centrally disposed opening to an outer periphery and a predetermined number of core shaped first legs formed integrally therewith extending from said outer periphery, each said first leg extending substantially perpendicularly upwardly from said first core base in the vicinity of said outer periphery to form first core component portions, and a generally ring-shaped second laminar core formed of a second predetermined number of superposed, magnetically permeable second metal sheets, each said second metal sheet having a core base extending from an outer periphery to an inner periphery defining a second centrally disposed opening and a predetermined number of core shaped second legs corresponding with said predetermined number and shape of said core shaped first legs and extending upwardly from said inner periphery to form second core component portions, said first core component portions and said second core component portions being joined in mutual adjacency to form core components arranged in predetermined generally circular locus within said core component support region;
field winding means positioned about said core components and selectively excitable to effect actuation of said motor; and
a rotor rotatable about said axis of rotation and supporting a predetermined number of permanent magnet regions for interaction with said core components and selectively excited winding means.

16. A d.c. motor comprising:
a stator assembly having a given axis;
a rotor rotatable about said given axis and extending outwardly therefrom for supporting arcuately shaped permanent magnets having flux generation surfaces of select widthwise extent between the sides thereof for movement therewith along a circular locus, said magnets being magnetized having predetermined regions of alternating polarity asserted substantially coaxially with said given axis from said flux generation surfaces;
a core structure mounted upon said stator assembly and having a plurality of radially alligned substantially concentric and mutually paired magnetically permeable core components having mutually inwardly disposed surfaces, each said core component extending in generally parallel relationship with said given axis to define a winding association region, a flux interaction region at said mutually inwardly disposed surfaces of each pair of said core components and an end surface, each end surfaces of each said pair of core components being located adjacent and at opposite said sides of said permanent magnets at a position beyond said flux generation surfaces selected for effecting flux coupling relationships substantially only with said flux interaction regions so as to minimize magnetic attraction therebetween along force vectors parallel with said given axis and to provide localized balancing of radially directed magnetization force vectors.

* * * * *